(12) United States Patent
Thomas (10) Patent No.: US 9,899,829 B2
(45) Date of Patent: Feb. 20, 2018

(54) PASSIVE FAULT CURRENT LIMITER FOR WIND POWER APPLICATIONS

(71) Applicant: SIEMENS AKTIENGESELLSCHAFT, München (DE)

(72) Inventor: Arwyn Thomas, Cheshire (GB)

(73) Assignee: SIEMENS AKTIENGESELLSCHAFT (DE)

( * ) Notice: Subject to any disclaimer, the term of this patent is extended or adjusted under 35 U.S.C. 154(b) by 293 days.

(21) Appl. No.: 14/613,390

(22) Filed: Feb. 4, 2015

(65) Prior Publication Data
US 2015/0288170 A1  Oct. 8, 2015

(30) Foreign Application Priority Data

Apr. 3, 2014  (EP) ..................................... 14163410

(51) Int. Cl.
| | |
|---|---|
| *H01F 21/00* | (2006.01) |
| *H02H 9/02* | (2006.01) |
| *H01F 27/24* | (2006.01) |
| *H01F 27/28* | (2006.01) |

(Continued)

(52) U.S. Cl.
CPC .................. *H02H 9/02* (2013.01); *H01F 3/10* (2013.01); *H01F 21/00* (2013.01); *H01F 27/24* (2013.01);
(Continued)

(58) Field of Classification Search
CPC ....................... H01F 27/00–27/36; H01F 21/00
(Continued)

(56) References Cited

U.S. PATENT DOCUMENTS 2,435,062 A  *  1/1948  Walsh .................. H02M 7/043
                                                              363/140
2,972,715 A  *  2/1961  Ringelman ............... G05F 1/32
                                                              323/330

(Continued)

FOREIGN PATENT DOCUMENTS

WO  WO 2009035191 A1 *  3/2009  ............. H01H 83/06

OTHER PUBLICATIONS

Iwahara et al: "Development of Passive Fault Current Limiter in Parallel Biasing Mode"; IEEE Transactions on Magnetics, IEEE Service Center; vol. 35; No. 5; pp. 3523-3525; ISSN: 0018-9464; DOI: 10.1109/20.800577; XP011087389; Sep. 1, 1999.

(Continued)

*Primary Examiner* — Tuyen Nguyen
(74) *Attorney, Agent, or Firm* — Schmeiser Olsen & Watts LLP (57) ABSTRACT

A device for limiting a fault current for a generator, in particular of a wind turbine is provided. A first frame is made of a ferromagnetic material, wherein the first frame comprises a first frame section and a further first frame section, wherein a first gap is formed between the first frame section and the further first frame section. A first coil is wound around the first frame section, wherein the first coil is connectable to a first stator winding of a stator of the generator. A further first coil is wound around the further first frame section, wherein the further first coil is connectable to an electronic device. A first permanent magnet element is arranged inside the first gap. The first frame section and the further first frame section are formed with respect to each other such that an electromagnetic interaction between the first coil and the first permanent magnet element and the further first coil and the first permanent magnet element is provided.

4 Claims, 3 Drawing Sheets

(51) Int. Cl.
    *H01F 27/38*     (2006.01)
    *H02H 7/06*     (2006.01)
    *H02K 15/04*     (2006.01)
    *H01F 3/10*     (2006.01)
    *H01F 29/14*     (2006.01)
    *H01F 38/02*     (2006.01)

(52) U.S. Cl.
    CPC ..... *H01F 27/2823* (2013.01); *H01F 27/2895* (2013.01); *H01F 27/38* (2013.01); *H01F 29/146* (2013.01); *H01F 38/023* (2013.01); *H02H 7/06* (2013.01); *H02K 15/0435* (2013.01); *H01F 2003/103* (2013.01); *Y10T 29/49009* (2015.01)

(58) Field of Classification Search
    USPC .................. 336/110, 212, 170–173, 220–223
    See application file for complete search history.

(56) References Cited

U.S. PATENT DOCUMENTS

| | | | | |
|---|---|---|---|---|
| 4,031,457 A | * | 6/1977 | Oberbeck | H02H 9/021 |
| | | | | 323/362 |
| 4,357,542 A | | 11/1982 | Kirschbaum | |
| 5,926,083 A | * | 7/1999 | Asaoka | H01F 3/10 |
| | | | | 336/110 |
| 6,885,272 B1 | | 4/2005 | Glavac | |
| 2014/0192450 A1 | | 7/2014 | Hall | |

OTHER PUBLICATIONS

European Extended Search Report issued Sep. 12, 2014; Application No. 14163410.5; 8 pgs.

* cited by examiner

PASSIVE FAULT CURRENT LIMITER FOR WIND POWER APPLICATIONS

CROSS-REFERENCE TO RELATED APPLICATIONS

This application claims priority to EP Application No. 14163410.5, having a filing date of Apr. 3, 2014, the entire contents of which are hereby incorporated by reference.

FIELD OF TECHNOLOGY

The following relates to a device for limiting a fault current for a generator, in particular of a wind turbine. Furthermore, the present invention relates to a method for manufacturing a device for limiting a fault current for a generator, in particular of a wind turbine.

BACKGROUND

Direct drive synchronous generators used in wind turbines have the inherent issue of dealing with short circuit faults, mainly due to converter short circuits, which are a high probability of happening over a lifetime. The result of the short circuit is that a large current is induced in the generator windings and causes thermal loads, magnet demagnetisation and large airgap torques. These short circuit currents can be three times higher than the operating current, resulting in airgap shear forces that can potentially damage the turbine structure.

This is circumvented by designing the structure of the generator and the wind turbine, respectively, more robust to cope with the increased fault condition loads, causing the turbine to be over designed for normal operation and adding costs to the final cost of energy (COE).

This is also done with magnets of the generator, in that the magnet height and grade are chosen to survive the short circuit field that is seen during the fault condition, again adding cost to the turbine generator.

SUMMARY

An aspect relates to providing a more lightweight wind turbine with a proper cost of energy (COE) rate.

This aspect is solved by a device for limiting a fault current for a generator, in particular of a wind turbine, by a wind turbine and by a method for manufacturing a device for limiting a fault current for a generator, in particular of a wind turbine, according to the independent claims.

According to a first aspect of embodiments of the present invention, a device for limiting a fault current for a generator, in particular of a wind turbine, is presented. A first frame of the device is made of a ferromagnetic material, wherein the first frame comprises a first frame section and a further first frame section. A first gap is formed between the first frame section and the further first frame section. A first coil of the device is wound around the first frame section, wherein the first coil is connectable to a first stator winding of a stator of the generator and to an electrical device, such as a frequency converter. A further first coil of the device is wound around the further first frame section, wherein the further first coil is connectable to the generator and to the electrical device, such as the frequency converter.

A first permanent magnet element arranged inside the first gap, wherein the first frame section and the further first frame section are formed with respect to each other such that an electromagnetic interaction between the first coil and the first permanent magnet element and the further first coil and the first permanent magnet element is provided. The first permanent magnet is in magnetic interaction with the first frame such that a first magnetic field circulating through the first frame section in a first circulating direction is generated, and a further first magnetic field circulating through the further first frame section orientated in a further first circulating direction which circulates in opposed direction with respect to the first magnetic field is generated.

The first coil is connectable to a first stator winding of a stator of the generator and e.g. to the electrical device, such that a first electromagnetic field which is orientated in opposed direction with respect to the first magnetic field is generate. The further first coil is connectable to the electronic device and e.g. to the stator, such that a further first electromagnetic field which is orientated in opposed direction with respect to the further first magnetic field is generate.

According to a further aspect of embodiments of the present invention, a wind turbine, such as a direct drive wind turbine is presented. The wind turbine comprises a generator comprising a stator with at least a first stator winding and an electronic device. Furthermore, the wind turbine comprises a device as described above. The first coil of the device is (electrically) connected between the (e.g. first stator winding of the) stator of the generator and the electronic device.

According to a further aspect of embodiments of the present invention, a method for manufacturing the above described device for limiting a fault current for a generator, in particular of a wind turbine, is described.

The above described wind turbine comprises a wind turbine tower and a nacelle pivotably mounted to the wind turbine tower. In the nacelle, the generator is installed. A hub comprising a plurality of wind turbine blades is coupled to the generator.

The generator comprises a rotor to which the hub is mounted and a stator. The stator comprises stator coils. The rotor rotates by the wind force acting on the wind turbine blades around the stator. The stator and the rotor are in electromagnetic interaction such that electrical power, e.g. voltage and current is generated.

In wind turbines, the generator may be configured as a so called direct drive generator. A direct drive generator is free of any gears. In order to prevent the use of gears, the diameter of the stator and of the rotor of the generator has to be very large.

The generator may be a three-phase generator and a direct drive synchronous generator, respectively, wherein a first type of coils form a first phase, a second type of coils form a second phase and a third type of coils forms a third phase.

Each type of coils is coupled to an electrical machine, such as a frequency converter, in order to control the phases with respect to each other.

The first coil and the further first coil may be of the same phase or may be of opposed phases. The first coils and the further first coils are wound around the respective frame sections in such a way that the fault current will generate the respective electromagnetic fields will have an opposing affect on the permanent magnet element.

In order to withstand and reduce a peak current and a fault current, respectively, the device according to embodiments of the present invention is installed. The device is coupled between the stator of the generator and the frequency converter. If a risk of a fault current arises, the device increases the inductance such that the fault current is reduced and damped.

The device according to embodiments of the present invention comprises a first frame made of ferromagnetic material. The first frame is for example made of iron, steel or other suitable ferromagnetic material comprising a high magnetic permeability.

The first frame may comprise a rectangular profile which surrounds an inner volume. At one side of the frame, a first frame section is defined. At another subtended side of the inner volume with respect to the first frame section, a second frame section is defined. The first coil is wound around the first frame section and may be coupled to a first stator winding of the stator with one end and to the electrical machine, e.g. the frequency converter, with the another end. The further first coil is wound around the further first frame section and is coupled to the first or another stator winding with one end and to the electrical machine, e.g. the frequency converter, with another end. The current flowing through the first coil may be shifted or may be in the same phase with respect to the current flowing through the further first coil.

Inside the inner volume and the gap, respectively, the first permanent magnet element is arranged. Under regular operating conditions, the current in the first coil is within predefined threshold values. The permanent magnet element is then arranged within the inner volume such that a proper magnetic flux between the first coil and the further first coil and hence a low inductance is given.

Specifically, the permanent magnet comprises a north and a south pole and is in magnetic interaction with the first frame. Hence, because the first frame is made of a ferromagnetic material, a first magnetic field is generated which circulates through the first frame section in the first circulating direction and the further first magnetic field is generated circulating through the further first frame section, wherein the further first magnetic field comprises a further first circulating direction which is directed in opposed direction with respect to the first magnetic field.

The respective first coil and the further first coil comprises respective current flows which generate a respective first and further first electromagnetic field with predetermined circulating directions. Hence, the current flow through the first coil is configured such that the first electromagnetic field is generated which is orientated in opposed direction with respect to the first magnetic field generated by the permanent magnet. Additionally, the current flow through the further first coil is configured such that the further first magnetic electromagnetic field is generated which is orientated in opposed direction with respect to the further first magnetic field.

Hence, the first electromagnetic field acts in counter-direction with respect to the first magnetic field and the further first electromagnetic field acts in counter-direction to the further first magnetic field.

Hence, if low current flow is flowing through the respective first and further first coil, the permanent magnet element generates respective first and further first magnetic fields which provide a strong magnetic saturation in the ferromagnetic first frame. Hence, the inductance of the first coil and the further first coil is low.

However, if the current increases in the first coil and for the further first coil, the respective first electromagnetic field and the further first electromagnetic field is becoming stronger such that the effect of the permanent magnet is reduced and the inductance increases.

This result in that a fault current comprising a dangerous current is damped due to the high inductance caused by the respective electromagnetic fields oriented in counter-direction to the respective first and further first magnetic fields the permanent magnet.

Hence, a passive fault current limiter is given, because no movable parts are necessary for limiting a fault current. The higher the current, the higher the electromagnetic fields, and hence the higher the inductance. The device for limiting a fault current may be named as a passive fault current limiter (pFLT).

Summarizing, the initial peak current (fault current) is limited due to variable inductance of the device, which inductance is increased when a critical current threshold is breached. The device comprises therefore the first frame (e.g. a first electrical steel core) which is saturated by the first permanent magnet element. The first coil and the further first coil (i.e. respective first and further first armature windings) around the steel core carry the electrical phase currents. During normal operation the electrical current is not enough to bring the first permanent magnet element of the device out of saturation due to counter-directed electromagnetic fields and therefore the inductance remains low. However, when the current increases, the first frame is in a non-saturated phase. By the thereby generated demagnetising effect of the respective electromagnetic fields caused by fault current in the respective coils, the inductance is increased dramatically, thereby limiting the fault current.

The utilising of the device (pFLT) can allow for a reduction in the margin of safety needed for the fault condition demagnetisation and torque for a wind turbine. Hence, the wind turbine and specifically the generator may have a more lightweight design such that the manufacturing costs are reduced and the bust of energy is increased, respectively.

According to a further exemplary embodiment, the device comprises a second frame made of a ferromagnetic material; wherein the second frame comprises a second frame section and a further second frame section. A second gap is formed between the second frame section and the further second frame section. A second coil is wound around the second frame section, wherein the second coil is connectable to a second stator winding (forming e.g. a second phase of the stator) of the stator of the generator. A further second coil is wound around the further second frame section, wherein the further second coil is connectable to the stator and to the electronic device. A second permanent magnet element arranged inside the second gap, wherein the second frame section and the further second frame section are formed with respect to each other such that an electromagnetic interaction between the second coil and the second permanent magnet element and the further second coil and the second permanent magnet element is provided.

The second permanent magnet element is in magnetic interaction with the second frame such that a second magnetic field circulating through the second frame section in a second circulating direction is generated and a further second magnetic field circulating through the further second frame section orientated in a further second circulating direction which circulates in opposed direction with respect to the second magnetic field is generated.

The second coil is connectable to a second stator winding of a stator of the generator, such that a second electromagnetic field which is orientated in opposed direction with respect to the second magnetic field is generated, wherein the further second coil is connectable to an electronic device, such that a further second electromagnetic field which is orientated in opposed direction with respect to the further second magnetic field is generated.

Similarly to the exemplary embodiment described above concerning the second frame, the device may additionally comprise as further exemplary embodiment a third frame made of a ferromagnetic material, wherein the third frame comprises a third frame section and a further third frame section. A third gap is formed between the third frame section and the further third frame section. A third coil is wound around the third frame section, wherein the third coil is connectable to a third stator winding (e.g. a third phase of the stator) of the stator of the generator and to the electrical device, such as the frequency converter. A further third coil is wound around the further third frame section, wherein the further third coil is connectable to the stator and electronic device, i.e. the frequency converter.

A third permanent magnet element arranged inside the third gap. The third frame section and the further third frame section are formed with respect to each other such that an electromagnetic interaction between the third coil and the third permanent magnet element and the further third coil and the third permanent magnet element is provided. The third permanent magnet element is in magnetic interaction with the third frame such that a third magnetic field circulating through the third frame section in a third circulating direction is generated and a further third magnetic field circulating through the further third frame section orientated in a further third circulating direction which circulates in opposed direction with respect to the third magnetic field is generated.

The third coil is connectable to a third stator winding of a stator of the generator, such that a third electromagnetic field which is orientated in opposed direction with respect to the third magnetic field is generated, wherein the further third coil is connectable to an electronic device, such that a further third electromagnetic field which is orientated in opposed direction with respect to the further third magnetic field is generated.

However, the first permanent magnet element, the second permanent magnet element and/or the third permanent magnet element may be formed monolithically and in one piece such that respective sections of the first permanent magnet element are locatable within the first gap, the second gap and the third gap, such that an inductance between the respective pairs of first, second and third coils is adjustable for reducing a peak current.

The first frame, the second frame and the third frame may be structurally separate parts or may form on common frame, for example.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

BRIEF DESCRIPTION

Some of the embodiments will be described in detail, with reference to the following figures, wherein like designations denote like members, wherein.

DETAILED DESCRIPTION

Figure 1:
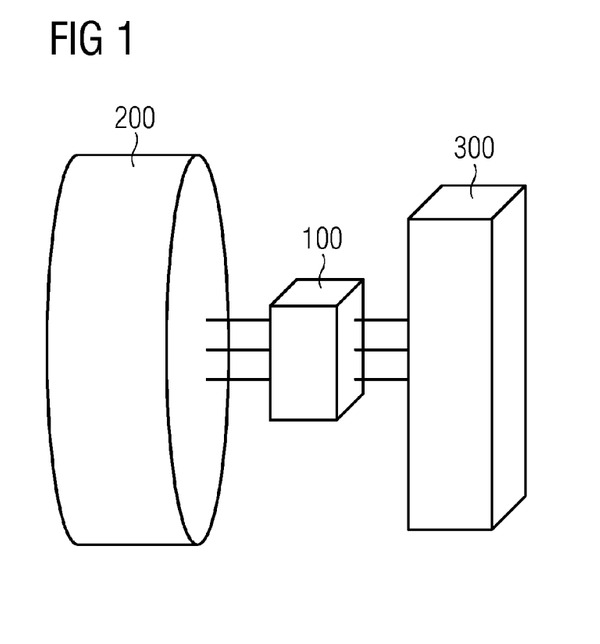
FIG. 1 shows a schematic view of a generator of a wind turbine comprising a device according to an exemplary embodiment of the present invention.

FIG. 1 shows components of a wind turbine, such as a direct drive wind turbine. The wind turbine comprises a generator 200 comprising a stator with at least a first stator winding, and an electronic device 300, such as a frequency converter. A device 100 for limiting a fault current of the generator 200 is coupled between the generator 200 and the electronic device 300.

Figure 2:
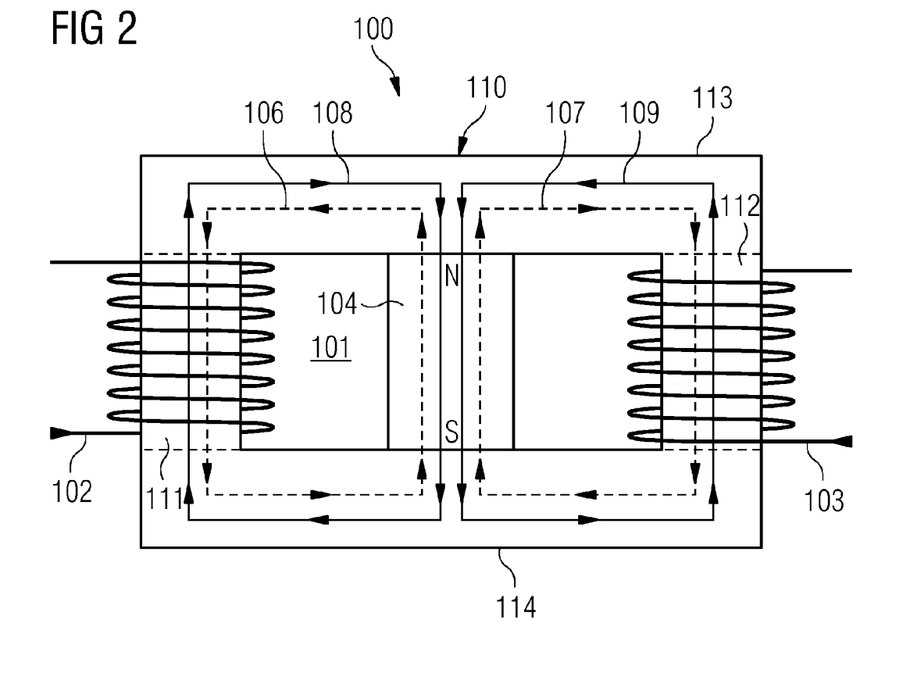
FIG. 2 shows a schematic view of the device according to an exemplary embodiment of the present invention.

FIG. 2 shows a more detailed view of the device 100 for limiting a fault current for a generator 200 shown in FIG. 1. A first frame 110 is made of a ferromagnetic material, wherein the first frame 110 comprises a first frame section 111 and a further first frame section 112, wherein a first gap 101 is formed between the first frame section 111 and the further first frame section 112. A first coil 102 is wound around the first frame section 111, wherein the first coil 102 is connectable to a first stator winding of a stator of the generator 200 on the one side and to an electrical device 300 such as a frequency converter, on the other side. A further first coil 103 is wound around the further first frame section 112, wherein the further first coil 103 is connectable to the electronic device 300 on the one side and to the generator 200 on the other side.

The device 100 comprises the first frame 110 made of ferromagnetic material. The first frame 110 is for example made of iron, steel or other suitable ferromagnetic material comprising a high magnetic permeability.

The first frame 110 comprises a rectangular profile which surrounds an inner volume and the gap 101, respectively. At one side of the first frame 110, a first frame section 111 is defined. At another subtended side of the inner volume with respect to the first frame section 111, a second frame section 112 is defined. The first coil 102 is wound around the first frame section 111 and coupled to a first stator winding of the stator. The first stator winding may form a first phase of the generator 200. The further first coil 103 is wound around the further first frame section 112 and is coupled to the frequency converter 300.

The first frame section 111 and the second frame section 112 are spaced apart from each other, wherein a first connecting frame section 113 connects respective free ends of the first frame section 111 and the further first frame section 112. A further first connecting frame section 114 connects respective further free ends of the first frame section 111 and the further first frame section 112.

A first permanent magnet element 104 is arranged within the gap 101 which is surrounded by the first frame section 111, the first connecting frame section 113, the further first frame section 112 and the further first connecting frame section 114. For example, a north pole section N of the first permanent magnet element 104 is magnetically coupled and for example in contact with the first connecting frame section 113 and a south pole section S of the first permanent magnet element 104 is magnetically coupled and for example in contact with the further first connecting frame section 114.

The first permanent magnet element 104 is arranged inside the first gap 101, wherein the first frame section 111 and the further first frame section 112 are formed with respect to each other such that an electromagnetic interaction between the first coil 102 and the first permanent magnet element 104 and the further first coil 103 first permanent magnet element 104 is provided. The first permanent magnet element 104 is in magnetic interaction with the first frame 110 such that a first magnetic field 106 circulating through the first frame section 111 in a first circulating direction is generated, and a further first magnetic field 107 circulating through the further first frame section 112 orientated in a further first circulating direction which circulates in opposed direction with respect to the first magnetic field 106 is generated.

The first coil 102 is connectable to a first stator winding of a stator of the generator 200 and to the electrical machine 300, such that a first electromagnetic field 108 which is orientated in opposed direction with respect to the first magnetic field 106 is generated. The further first coil 103 is connectable to the stator 200 and to the electronic device 300, such that a further first electromagnetic field 109 which is orientated in opposed direction with respect to the further first magnetic field 107 is generated.

Specifically, the permanent magnet element 104 comprises a north and a south pole and is in magnetic interaction with the first frame 110. Hence, because the first frame 110 is made of a ferromagnetic material, a first magnetic field 106 is generated which circulates through the first frame section 111 in the first circulating direction and the further first magnetic field 107 is generated circulating through the further first frame section 112, wherein the further first magnetic field 107 comprises a further first circulating direction which is directed in opposed direction with respect to the first magnetic field 106.

The respective first coil 102 and the further first coil 103 comprises respective currents flows which generates a respective first and further first electromagnetic field 109 with predetermined circulating directions. Hence, the current flow through the first coil 102 is configured such that the first electromagnetic field 108 is generated which is orientated in opposed direction with respect to the first magnetic field 106 generated by the permanent magnet. Additionally, the current flow through the further first coil 103 is configured such that the further first magnetic electromagnetic fields is generated which is orientated in opposed direction with respect to the further first magnetic field 107.

The first magnet field path of the first magnet field 106 goes from the south pole S to the north pole N of the permanent magnet element 104, further to the first connecting frame section 113, further through the first frame section 111 and through the first coil 102, respectively, and further through the further first connecting frame section 114 to the south pole S of the first permanent magnet element 104.

The further first magnet field path of the further first magnet field 107 goes from the south pole S to the north pole N of the permanent magnet element 104, further to the first connecting frame section 113, further through the further first frame section 112 and through the further first coil 103, respectively, and further through the further first connecting frame section 114 to the south pole S of the first permanent magnet element 104.

The first electromagnetic field path of the first electromagnetic field 108 goes from the north pole N to the south pole S of the permanent magnet element 104, further to the further first connecting frame section 114, further through the first frame section 111 and through the first coil 102, respectively, and further through the first connecting frame section 113 to the north pole N of the first permanent magnet element 104.

The further first electromagnetic field path of the further first electromagnetic field 109 goes from the north pole N to the south pole S of the permanent magnet element 104, further to the further first connecting frame section 114, further through the further first frame section 112 and through the further first coil 103, respectively, and further through the first connecting frame section 113 to the north pole N of the first permanent magnet element 104.

Hence, the first electromagnetic field 108 acts in counter-direction with respect to the first magnetic field 106 and the further first electromagnetic field 109 acts in counter-direction to the further first magnetic field 107.

Hence, if low current flow is flowing through the respective first and further first coil 103, the permanent magnet element generates respective first and further first magnetic fields 106, 107 which provide a strong magnetic saturation in the ferromagnetic first frame 110. Hence, the inductance of the first coil 102 and the further first coil 103 is low.

However, if the current increases in the first coil 102 and the further first coil 103, the respective first electromagnetic field 108 and the further first electromagnetic field 109 is becoming stronger such that the effect of the permanent magnet is reduced and the inductance increases.

This result in that a fault current comprising a dangerous current is minimized in the first coil 102 and the further first coil 103 due to damping by the high inductance caused by the respective electromagnetic field oriented in counter-direction to the respective first and further first magnetic field 107 the first permanent magnet element 104.

Hence, a passive fault current limiter is given, because no movable parts are necessary for limiting a fault current. The higher the current, the higher the electromagnetic fields 108, 109 and hence the higher the inductance.

In order to withstand and reduce a peak current 301 (see FIG. 3) and a fault current, respectively, the device 100 is installed. The device 100 is coupled between the stator of the generator 200 and the frequency converter 300. If a risk of a fault current arises, the device 100 increases the inductance such that the fault current is reduced and damped.

Inside the inner volume and the gap 101, respectively, the first permanent magnet element 104 is arranged. Under regular operating conditions, the current in the first coil 102 is within predefined gas threshold values. The permanent magnet element 104 is then arranged within the first gap 101 such that a proper magnetic flux between the first coil 102 and the further first coil 103 and hence a low inductance is given.

The device 100 may comprise in further exemplary embodiments respective second frames and third frames to which respective second and third coils are attached, wherein the second and third coils are connected to respective second and third phases of the generator 200.

Figure 3:
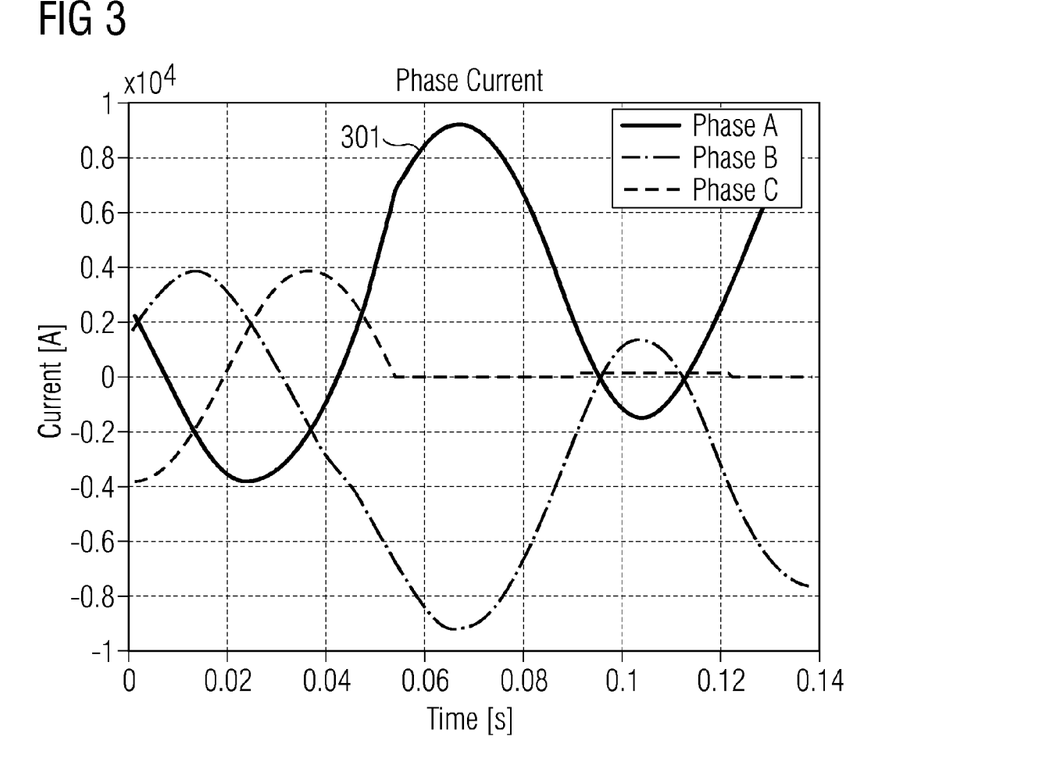
FIG. 3 shows a diagram showing a peak current of a phase of the generator.

FIG. 3 shows a diagram showing a peak current 301 of a phrase of the AC generator 200. As shown in FIG. 3, AC current of an AC circuit of a first phase A coupled to the first coil 102, an AC current of an AC circuit of a second phase B coupled to the second coil and an AC current of an AC circuit of a third phase C coupled to the third coil of a three-phase generator 200 is shown. At a certain time point, the peak current 301 in phase A is determined.

Figure 4:
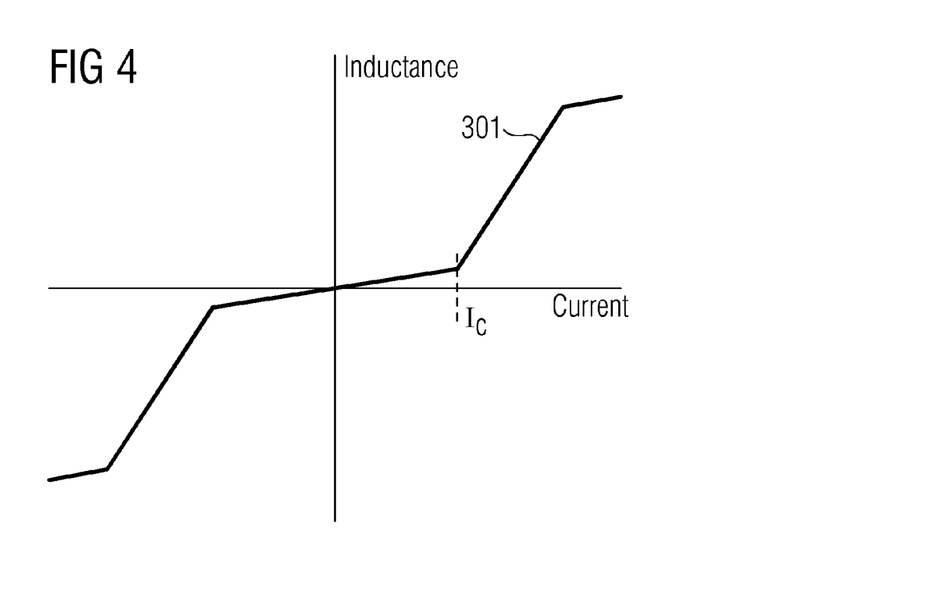
FIG. 4 shows a diagram showing the relationship between the inductance and the current.

FIG. 4 shows a diagram showing the relationship between the inductance and the current. If a peak current 301 occurs, the inductance increases and thereby damps the peak current 301.

Figure 5:
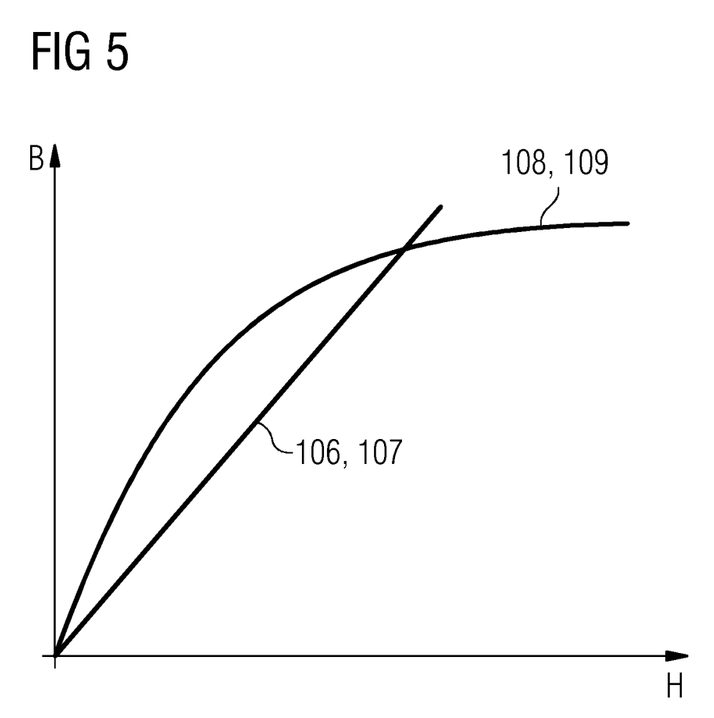
FIG. 5 shows a diagram showing the relationship between the magnetic field strength of the respective first electromagnetic field and the respective first magnetic field.

FIG. 5 shows an H-B-diagram showing the relationship between the magnetic field strength of one respective first electromagnetic field 108, 109 and of one respective first magnetic field 106, 107. If the magnetic field strength H of the first and further first magnetic field 106, 107 is larger than the magnetic field strength H of the first and further first electromagnetic field 108, 109, the inductance is kept low.

If the magnetic field strength H of the first and further first electromagnetic shield 108, 109 is larger than the magnetic field strength H of the first and further first magnetic field 106, 107, the inductance increased, in particular stepwise, as shown in FIG. 4, in the region of the peak current 301.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A device for limiting a fault current for an AC generator of a wind turbine, the device comprising
a first frame made of a ferromagnetic material, wherein the first frame comprises a first frame section and a further first frame section, wherein a first gap is formed between the first frame section and the further first frame section,
a first coil wound around the first frame section,
a further first coil wound around the further first frame section, and
a first permanent magnet element which is arranged inside the first gap, wherein the first frame section and the further first frame section are formed with respect to each other such that an electromagnetic interaction between the first coil and the first permanent magnet element and the further first coil first permanent magnet element is provided, wherein the first permanent magnet element is in magnetic interaction with the first frame such that
an AC current flowing through the first coil;
a first magnetic field circulating through the first frame section in a first circulating direction is generated by the AC circuit,
an AC current flowing through the further first coil; and
a further first magnetic field circulating through the further first frame section orientated in a further first circulating direction which circulates in opposed direction with respect to the first magnetic field is generated, wherein the first coil is connectable to a first stator winding of a stator of the AC generator, such that a first electromagnetic field which is orientated in opposed direction with respect to the first magnetic field is generated, wherein the further first coil is connectable to a frequency converter, such that a further first electromagnetic field which is orientated in opposed direction with respect to the further first magnetic field is generated.

2. The device according to claim 1, further comprising
a second frame made of a ferromagnetic material, wherein the second frame comprises a second frame section and a further second frame section, wherein a second gap is formed between the second frame section and the further second frame section,
a second coil wound around the second frame section,
a further second coil wound around the further second frame section,
a second permanent magnet element arranged inside the second gap, wherein the second frame section and the further second frame section are formed with respect to each other such that an electromagnetic interaction between the second coil and the second permanent magnet element and the further second coil and the second permanent magnet element is provided,
wherein the second permanent magnet element is in magnetic interaction with the second frame such that
a second magnetic field circulating through the second frame section in a second circulating direction is generated, and
a further second magnetic field circulating through the further second frame section orientated in a further second circulating direction which circulates in opposed direction with respect to the second magnetic field is generated, wherein the second coil is connectable to a second stator winding of a stator of the generator, such that a second electromagnetic field which is orientated in opposed direction with respect to the second magnetic field is generated wherein the further second coil is connectable to the frequency converter, such that a further second electromagnetic field which is orientated in opposed direction with respect to the further second magnetic field is generated.

3. The device according to claim 2, wherein the first permanent magnet element and the second permanent magnet element are formed monolythically.

4. The device according to claim 1, further comprising
a third frame made of a ferromagnetic material, wherein the third frame comprises a third frame section and a further third frame section, wherein a third gap is formed between the third frame section and the further third frame section, a third coil wound around the third frame section, wherein the third coil is connectable to a third stator winding of the stator of the generator,
a further third coil wound around the further third frame section, wherein the further third coil is connectable to the frequency converter,
a third permanent magnet element arranged inside the third gap, wherein the third frame section and the further third frame section are formed with respect to each other such that an electromagnetic interaction between the third coil and the third permanent magnet element and the further third coil and the third permanent magnet element is provided, wherein the third permanent magnet element is in magnetic interaction with the third frame such that
a third magnetic field circulating through the third frame section in a third circulating direction is generated, and
a further third magnetic field circulating through the further third frame section orientated in a further third circulating direction which circulates in opposed direction with respect to the third magnetic field is generated, wherein the third coil is connectable to a third stator winding of a stator of the generator, such that a third electromagnetic field which is orientated in opposed direction with respect to the third magnetic field is generated, wherein the further third coil is connectable to the frequency converter, such that a further third electromagnetic field which is orientated in opposed direction with respect to the further third magnetic field is generated.

\* \* \* \* \*